April 5, 1932.  R. S. SANFORD  1,853,006

BRAKE LINING

Filed Aug. 27, 1928

INVENTOR.
R. S. Sanford
BY
ATTORNEY.

Patented Apr. 5, 1932　　　　　　　　　　　　　　　　　　　　　　1,853,006

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE LINING

Application filed August 27, 1928. Serial No. 302,259.

This invention relates to friction devices of that type commonly employed for imparting movement to or retarding movement of a movable element and is illustrated as embodied in a brake lining for automobile brakes.

In high duty brakes of all kinds, and particularly those in which the engaging surfaces are relatively small as compared with the energy to be absorbed, as in automotive brakes, the stresses and strains in the engaging members are very great, necessitating the use of a material of good stiffness and tensile strength. These qualities are, however, difficult to find combined in substances having also a good co-efficient of frictional resistance.

It is also of importance that these physical characteristics be retained in the lining material under all conditions of use such as when damp, as after car washing or usage in wet weather. When thoroughly wet, the lining is particularly sensitive to excessive stresses, the stiffness, tensile strength, and friction co-efficient being materially changed. These changes and shortcomings are noticeable to an appreciable degree in the conventional lining as ordinarily employed for automobile brakes.

Such a lining is usually constituted of a plurality of plies of asbestos and cotton fabric interwoven with stiffening wire, the whole suitably impregnated with permeating, cementing drying oil or other suitable binder. The interwoven cords of each fabric ply are each made of a plurality of strands twisted together, each strand being composed principally of asbestos fibers, together with an amount of textile material such as cotton to give sufficient strength to the inherently weak asbestos, the mixed asbestos and cotton yarn suitably woven about a wire core.

Wetting of such a fabric will, due to the presence of the large proportion of asbestos and textile material, usually from 80 to 95% by volume necessarily weaken the lining, with a resultant detrimental change in the friction co-efficient. Furthermore excessive moisture on the lining surface gives a film of water acting as a lubricant with brake application.

It is to obviate the deleterious effects of wetting that my invention is particularly designed, further objects being to secure a lining which will retain, wet or dry, a substantially unvarying friction co-efficient with steel under all service conditions and which will operate effectively under extremely adverse conditions of friction, heat and exposure. This result I propose to accomplish by substantially increasing the metal content of the lining previously described, in such proportion with respect to the remaining materials, and to have due regard for the selection of such materials, as will yield a lining possessing a friction co-efficient with steel of approximately .5 and retain this co-efficient under all conditions of service.

In the preferred embodiment of my invention, I propose to use a relatively small proportion of textile material such as mixed cotton and asbestos yarn woven about each wire core, or otherwise admixed with the metal, which necessarily calls for less binder content. I suggest that the composite material constitute approximately 50% wire or other metal preferably of copper, the remaining 50% of materials to be preferably made up of the usual asbestos, textile material and binder, and I further suggest that the metal per se and remaining materials possess friction co-efficients with steel of approximately .3, and .7 respectively giving, with a 50/50 mixture a mean co-efficient of approximately .5. The percentages given indicate proportions by volume.

The above and other objects and features of the invention will be apparent from the following description of one illustrative embodiment shown in the accompanying drawings, in which.

Figure 4:
Figure 4 is a cross sectional view of one of the strands employed in the making of each cord.

In the illustrated embodiment of my invention the brake lining is shown comprising a strip 10 of double selvage fabric formed from interwoven or interlaced cords 12. Each cord is preferably made up of a plurality of strands 14 preferably twisted together and each strand may be composed of mixed fibers of asbestos and cotton 16 suitably woven about a copper wire core 18. The relative amounts of wire and yarn employed in my lining is best indicated in Figure 4 wherein a wire core of large cross sectional area in proportion to that of the surrounding yarn is disclosed.

Figure 1:
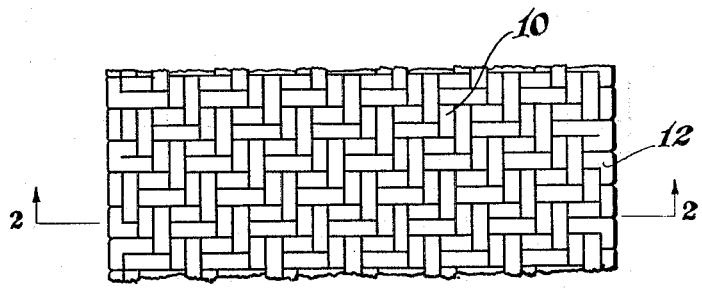
Figure 1 is a plan view of a portion of brake lining constructed in accordance with my invention.
Figure 2:
Figure 2 is a transverse section on the line 2—2 of Figure 1.
Figure 3:
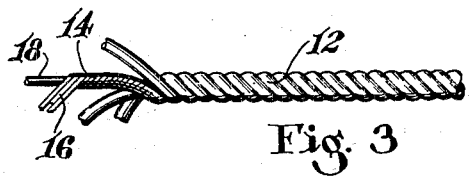
Figure 3 is a detail of one of the cords employed.

The lining may be impregnated with a suitable binding agent such as linseed oil, wood oil, or bitumen which serves to bind the fibers and wires together and in general increase the tensile strength of the whole. Compression of the lining in a suitable press leaves the same in the form disclosed in Figure 2.

My invention is particularly directed to securing a lining which is unaffected by water and incidentally to produce a highly serviceable and efficient product which will stand extremely adverse conditions of heat and friction and at the same time maintain a substantially unvarying co-efficient of friction with the brake drum.

This result I achieve by preferably using in my novel lining approximately 50% by volume of a high grade wire of copper, or perhaps of steel, brass, or bronze, having a co-efficient of friction of approximately .3 with the steel of the drum. I also preferably select remaining materials having as an entirety a coefficient friction of approximately .7, the two yielding a composite having a co-efficient of approximately .5. By virtue of the relatively high metal content, a very strong and serviceable lining is produced having the tensile strength, resiliency and other necessary qualities and is substantially unaffected by water. The particular selection of friction co-efficients of the metal and remaining materials is also conducive to the production of the product desired.

With application of the lining to a brake drum or other revolving part the friction or resistance to motion, develops heat in the transition of energy. With a lining possessing a relatively large amount of metal, the heat developed as a result of the contact between the lining and metallic drum is relatively high, which heat, conducted throughout the lining by the woven wire, serves the useful function of rapidly drying the wet asbestos and other materials. The initial wetting of the lining does not appreciably affect the wire but does on the other hand affect the remaining nonmetallic materials to the extent of appreciably changing their co-efficient. Any moisture on exposed wire is immediately volatilized by the heat developed in the first appreciable increment of movement of the lining with respect to the drum. Furthermore the water on the lining tends to act as a lubricant obviously reducing the frictional co-efficient. With an excessive amount of wire this effect is minimized, the wire literally wiping the water or moisture off, overcoming any surface tension of the same and volatilizing it as previously described. The original dry co-efficient is then quickly restored.

While there has been shown and described only one embodiment of the invention, it is to be understood that the same is not limited thereto, but may be embodied in various forms. For example the wire core may be dispensed with and flocculent metal in the proportion desired may be uniformly distributed throughout the lining without departing from the spirit of the invention. Reference will therefore be had to the appended claims for a definition of the limits of the invention.

I claim:

1. Friction lining characterized by reinforcing metal having a co-efficient of friction with the steel of a brake drum of .3, together with other ingredients having as an entirety a co-efficient of friction with steel of .7, the two factors so proportioned as to yield a composite lining having a mean co-efficient of friction with steel of .5.

2. Friction lining comprising asbestos and other ingredients having a co-efficient of friction with steel of .7, together with reinforcing wire for said asbestos and other ingredients having such a co-efficient of friction with steel and being so proportioned by volume with respect to the asbestos and other ingredients as to produce a composite lining having a co-efficient of friction with steel of approximately .5.

3. A friction lining comprising wire and other ingredients, the two factors having different co-efficients of friction with steel and combined in such proportions as to give a mean co-efficient of friction of approximately .5, said lining having a substantially unvarying co-efficient irrespective of its degree of saturation with water.

4. A friction lining comprising wire and other ingredients, the two factors having different co-efficients of friction with steel and combined in such proportions as to give a mean co-efficient of friction of .5, said lining having a substantially unvarying co-efficient irrespective of its degree of saturation with water.

5. A friction lining including strands of asbestos and cotton covered wire, the wire of each strand being of steel, said wire predominating in the cross sectional area of the strand.

6. A brake lining comprising woven strands, each strand comprising a wire of relatively great cross section lightly covered with a yarn including asbestos, the wire constituting at least 50% of the cross sectional area of each of said strands.

7. A friction lining for brakes and clutches comprising a water absorbent material and a finely divided heat conductive material distributed throughout said absorbent material in such substantially equal proportions so as to render the absorbent material dry by the heat developed during braking or clutching.

8. A brake friction material comprising a woven lining having a tendency to absorb water together with a finely divided metallic heat conductive material distributed throughout said woven lining in such substantially equal proportions by volume so as to render the lining dry by the heat developed during braking.

9. Friction lining comprising copper wires individually covered with an asbestos fabric having a coefficient of friction with steel which is higher than that of copper, the copper and fabric being present in about equal proportions to produce a composite lining having a coefficient of friction intermediate those of the copper and fabric.

In testimony whereof, I have hereunto signed my name.

ROY S. SANFORD.